United States Patent
De'Longhi

(10) Patent No.: US 8,353,242 B2
(45) Date of Patent: Jan. 15, 2013

(54) FRYER

(75) Inventor: Giuseppe De'Longhi, Treviso (IT)

(73) Assignee: De'Longhi S.p.A., Treviso (IT)

( * ) Notice: Subject to any disclaimer, the term of this patent is extended or adjusted under 35 U.S.C. 154(b) by 845 days.

(21) Appl. No.: 12/467,824

(22) Filed: May 18, 2009

(65) Prior Publication Data
US 2009/0217824 A1 Sep. 3, 2009

Related U.S. Application Data

(62) Division of application No. 10/584,422, filed on Jun. 22, 2006, now Pat. No. 7,669,520.

(30) Foreign Application Priority Data

Dec. 23, 2003 (IT) .............................. MI2003A2576
Dec. 14, 2004 (WO) ................. PCT/EP2004/014221

(51) Int. Cl.
 *A47J 37/12* (2006.01)
 *A47J 37/00* (2006.01)
(52) U.S. Cl. ................ 99/407; 99/409; 99/427; 99/476; 99/479; 219/400; 126/21 A

(58) Field of Classification Search .................... 99/404, 99/407, 409, 427, 474, 476, 477, 478, 479; 219/400; 126/21 A
See application file for complete search history.

(56) References Cited

U.S. PATENT DOCUMENTS

| | | | | |
|---|---|---|---|---|
| 4,439,459 A | * | 3/1984 | Swartley | 426/438 |
| 5,543,166 A | * | 8/1996 | Masel et al. | 426/523 |
| 5,676,870 A | * | 10/1997 | Wassman et al. | 219/400 |
| 6,708,603 B1 | * | 3/2004 | Li-Chen | 99/409 |
| 6,834,577 B2 | * | 12/2004 | Xu | 99/409 |
| 2002/0092427 A1 | * | 7/2002 | Masel et al. | 99/403 |

\* cited by examiner

*Primary Examiner* — Reginald L Alexander
(74) *Attorney, Agent, or Firm* — Blank Rome LLP

(57) ABSTRACT

A fryer has an oil container, a rotatable cooking basket therein, and a body of oil in the container. The body of oil and a stream of air are heated, and the basket is positioned with the food therein at least partially above the body of oil so the heated air stream can circulate through the basket and air-cook the food. Cyclically the basket is at least partially immersed in the heated oil to also cook the food with the oil.

25 Claims, 1 Drawing Sheet

FRYER

CROSS REFERENCE TO RELATED APPLICATIONS

This application is a division of U.S. application Ser. No. 10/584,422 files 22 Jun. 2006 as the US national phase of PCT application PCT/EP2004/014221, filed 14 Dec. 2004, published 14 Jul. 2005 as WO2005/063097, and claiming the priority of Italian patent application MI2003A002576 itself filed 23 Dec. 2003, whose entire disclosures are herewith incorporated by reference.

FIELD OF THE INVENTION

The present invention refers to a fryer of the type comprising an outer housing in which a container for the oil is inserted that in turn houses a rotatable basket.

BACKGROUND OF THE INVENTION

Known fryers suffer from various drawbacks including, above all, the fact that they require high oil consumption for cooking.

The organoleptic and nutritional properties of a food product cooked in excess oil can deteriorate and eating extremely fatty foods can, in the long term, be harmful to one's health.

Moreover, oil has a non-negligible cost and can cause disposal problems and, especially when it is hot, needs to be treated with extreme caution.

For this reason whoever operates a fryer with large amounts of oil is often tempted not to get rid of the oil, leaving it in the fryer to use it many times over thereafter, once again to the detriment of the wholesomeness of the food product thus prepared.

OBJECT OF THE INVENTION

The object of the present invention is, therefore, that of making a fryer that allows the aforementioned technical drawbacks of the prior art to be eliminated.

SUMMARY OF THE INVENTION

This object of the invention is attained in a fryer that does not require high oil consumption for cooking and that does not cause excessive oil absorption in the food product so as to enhance its organoleptic and nutritional properties and to maintain its wholesomeness.

Another purpose of the invention is that of making an extremely versatile fryer that is able to carry out different types of cooking for the same food product.

The last but not least purpose of the invention is that of making a fryer that is cost-effective and able to work with limited energy consumption.

These and other objects, according to the present invention, are accomplished by making a fryer comprising a rotatable cooking basket and an oil container wherein it has air heating means and forced circulation means of the heated air through the basket for at least partially cooking the food product contained in the basket through the heated air.

The present invention also discloses a method of cooking a food product with a fryer equipped with an oil container with a rotatable cooking basket wherein a forced circulation of hot air through the basket is generated with heating means, and in that the basket is positioned with respect to the container so as to keep the food product at least partially exposed to the heated air for at least a period of the cooking cycle to carry out at least partial cooking through the heated air.

BRIEF DESCRIPTION OF THE DRAWING

Further characteristics and advantages of the invention shall become clearer from the description of a preferred but not exclusive embodiment of the fryer according to the invention, illustrated for indicating and not limiting purposes in the attached drawings, in which.

SPECIFIC DESCRIPTION

Figure 1:
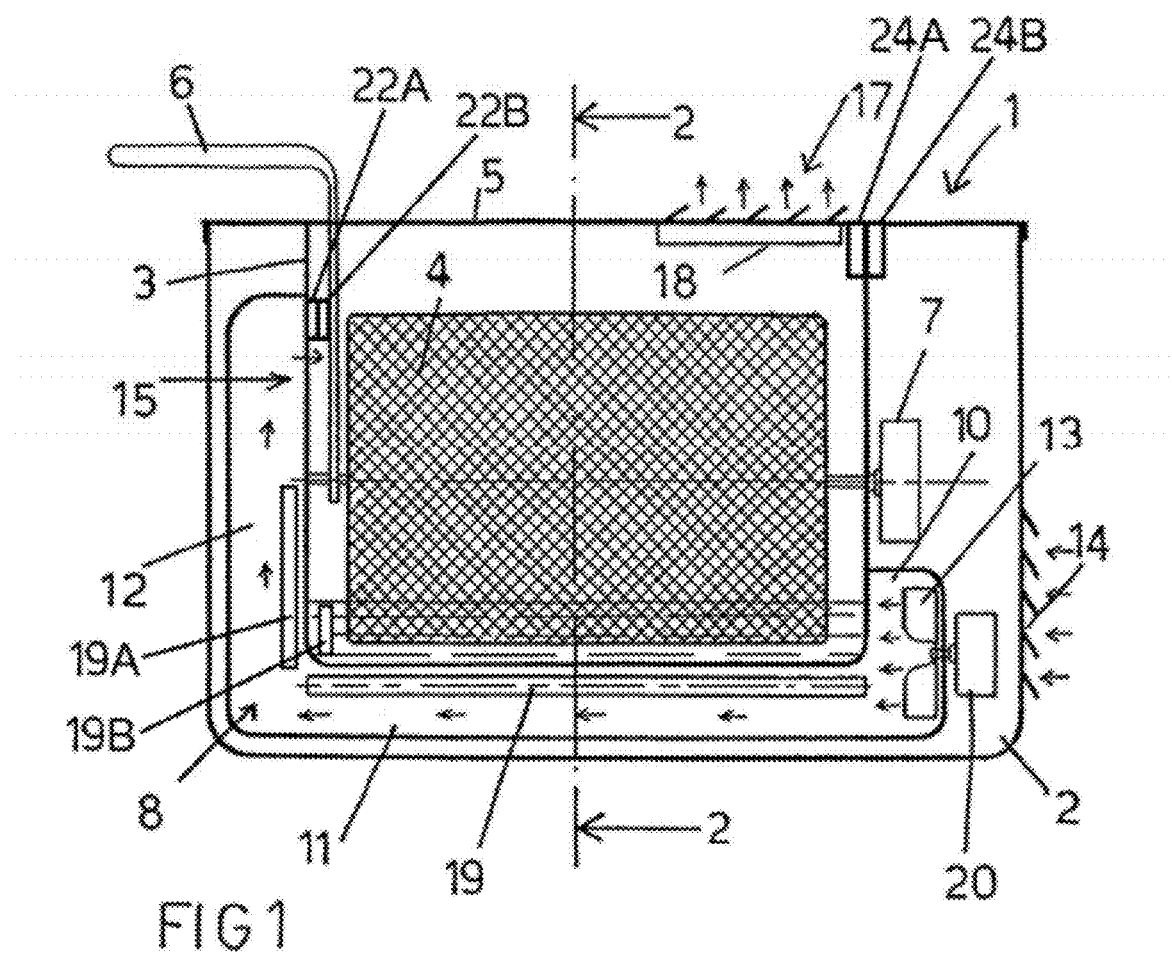
FIG. 1 schematically shows a top side partial section view of a fryer according to the present invention.
Figure 2:
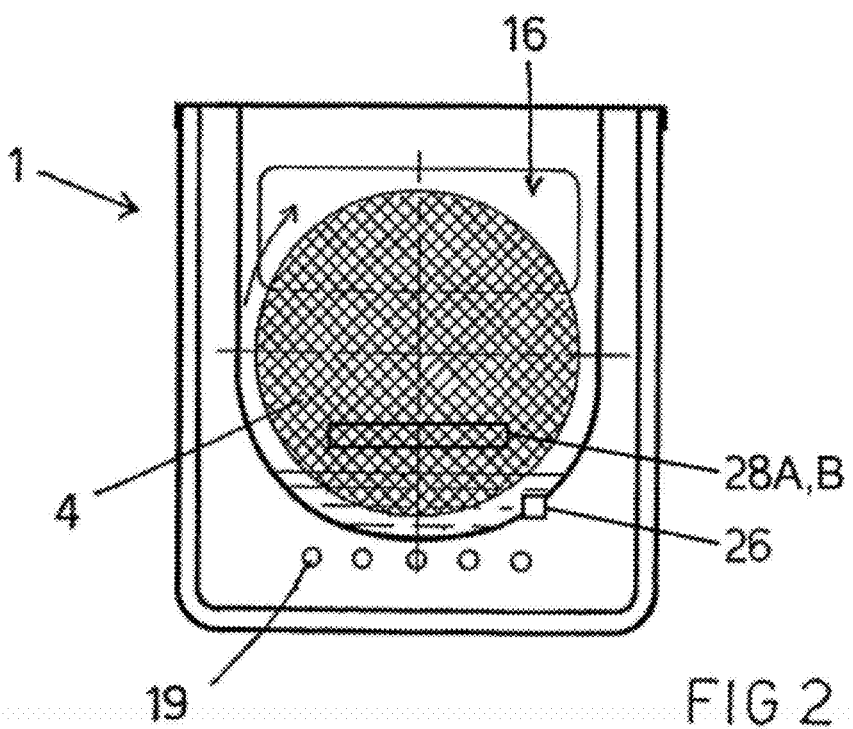
FIG. 2 shows a view of the fryer of FIG. 1 sectioned along line 2-2.

A fryer 1 comprises an outer housing 2 that houses a container 3 for oil equipped with a cover 5, and a rotatable basket 4 suitable for containing the food product to be cooked.

The basket 4 can be of the mesh type, as illustrated, or even of the perforated type. The basket 4 is a cylinder having a horizontal axis rotated by suitable motorized means, for example an electric motor 7 housed in a seat formed in the outer housing 2.

The fryer 1 has first positioning means of the basket 4 with respect to the container 3, for example mutual holding members 22A and 22B between the handle 6 of the basket 4 and the container 3 or the outer housing 2 suitable for locking the basket 4 at various heights with respect to the container 3, between a lower position of the basket 4 in which the food product must be able to be at least partially immersed in the oil present in the container 3, and an upper position of the basket 4 in which the food product must be able to be completely extracted from the oil present in the container 3.

The container 3 can have a configuration and arrangement such as to entirely house the basket 4 inside it, but it is also conceivable for the container 3 to be suitable for containing just a portion of the basket 4 or even for the basket 4 to be completely outside the container 3 and to be able to be introduced into the container 3 only upon request by actuating the first positioning means.

The fryer 1 is also provided with second positioning means of the container 3 with respect to the housing 2, for example mutual holding members 24A and 24B between the container 3 and the outer housing 2 suitable for locking the container 3 at various heights with respect to the bottom of the housing 2, between a lower position of the container 3 of minimum vicinity to the bottom of the housing 2, and an upper position of the container 3 of maximum distance from the bottom of the housing 2.

The fryer 1 is equipped with forced circulation means of heated air through the basket 4 to carry out the cooking of the food product precisely through the heated air. A forced circulation duct 8 of the heated air is formed between the outer surface of the container 3 and the inner side of the outer housing 2.

The circulation duct 8 has at least one initial portion 10 that extends parallel to the side surface of the container 3, an intermediate portion 11 that extends below the bottom of the container 3 and an end portion 12 that extends parallel to the side surface of the container 3 from the opposite side to the initial portion 10 with respect to the container 3. The forced circulation means of the heated air are preferably in the form of at least one fan 13 actuated by an electric motor 20. The fan 13 is positioned in the first portion 10 of the duct 8 and, in particular, is arranged with its rotation axis horizontal.

The initial portion 10 of the duct 8 has a fresh air inlet 14 formed through the outer housing 2, whereas the end portion 12 of the duct 8 has a heated air outlet 15 arranged at a greater height than the fresh air inlet 14. The container 3 has at least one opening 16 facing the heated air outlet 15 suitable for allowing the passage of heated air through the basket 4. A discharge passageway 17 of the heated air that has crossed the basket 4 is also formed through the cover 6 of the fryer 1.

Preferably, an air filter 18 covers the discharge passageway 17.

The fryer 1 is also equipped with air heating means, in particular in the form of at least one first electrical resistance 19. The first electrical resistance 19 is positioned in the intermediate portion 11 of the duct 8, below the bottom of the container 3. The air heating means can also include a second electrical resistance 19A positioned in the duct 8 downstream of the fan 13. A third electrical resistance 19B can also possibly be provided for directly heating the oil and positioned inside the container 3.

In a possible variant the fryer, especially in industrial applications, can have recirculation means of the oil in the container 3, in particular in the form of a pump 26, and it can also have a filter for the oil in the recirculation circuit.

The method of cooking a food product with the fryer 1 is, of course, based upon the fact that a forced circulation of hot air through the basket 4 is generated with heating means, and that the basket 4 is positioned with respect to the container 3 so as to keep the food product at least partially exposed to the heated air for at least a period of the cooking cycle to carry out at least partial cooking through the heated air. Advantageously, the same food product can be subjected to different types of cooking.

By adjusting the position of the basket 4 before and/or during cooking, indeed, the food product can be subjected to cooking steps in air and/or in oil, and the sequence and duration of each cooking step can be set as required.

For example, to cook potatoes it is advantageous to establish a first cooking step in heated air and a finishing step in oil to turn them golden.

It is also possible to keep the food product partially immersed in the oil for the whole cooking cycle, combining the effect of simultaneous cooking in oil and in heated air.

Alternatively, it is possible to cook the food product first in oil and then finish cooking in heated air.

At the user's discretion, it is also possible to fill the container 3 with oil and position the basket 4 in the container 3 so as to carry out conventional cooking with the food product completely immersed in the boiling oil.

The fryer 1 also offers the possibility of controlling the heating effect on the oil carried out by the air heating means. To do this, one intervenes on the second positioning means of the container 3 with respect to the housing 2 to adjust the distance between the container 3 and the resistance 19, so that by moving the container 3 away from the housing 2 the heating effect of the resistance 19 on the oil decreases and, vice-versa, by moving the container 3 toward the housing 2 the heating effect of the resistance 19 on the oil increases.

According to the type of cooking the power delivered by the heating means of the air and the oil can also be adjusted.

The first, second and third electrical resistances, indeed, can be activated selectively or simultaneously with or without relation with the position taken up by the basket 4.

Thus, the three resistances can be activated simultaneously or selectively when the basket 4 is in the raised and/or lowered position.

The fryer thus conceived can undergo numerous modifications and variants, all of which are covered by the inventive concept; moreover, all of the details can be replaced with technically equivalent elements.

For example, the structure of the basket can have suitable means for holding the food to be cooked inside it for preventing the food from suffering damage during rotation of the basket.

For fragile or delicate products, such as croquettes or other, which could break during the rotation of the basket, it is possible, for example, to provide a plurality of supports consisting of a horizontal plate 28A suspended in a balanced manner and free to rotate about a relative rotation pin so as to conserve the horizontal position during the rotation of the basket through the effect of its own weight.

Such holding means can also come in the form of gripping elements 28B suitable for holding the food to be cooked integrally with the basket during the rotation of the latter.

In practice, the materials used, as well as the sizes, can be whatever according to the requirements and the state of the art.

I claim:

1. A fryer for cooking food in oil, the fryer comprising:
   an oil container adapted to hold a body of the oil;
   a rotatable cooking basket in the oil container and adapted to hold the food;
   means for heating the body of oil in the container;
   means for positioning the basket with the food therein at least partially above the body of oil in the oil container;
   means for heating an air stream;
   means for forcedly circulating the heated air stream through the basket and over the food therein for at least partially cooking the food product contained in the basket while partially submerged in the body of oil; and
   a duct for the forced circulation of the heated air formed between the outer surface of the container and the inner side of an outer housing of the fryer in which the container is positioned,
   wherein the air stream heating means comprises at least one first electrical resistance arranged below the oil container and at least one second electrical resistance positioned in front of the forced circulation means.

2. The fryer according to claim 1 wherein the basket is cylinder-shaped positioned with its axis horizontal.

3. The fryer according to claim 1 wherein the basket is of the perforated or net type.

4. The fryer according to claim 1 wherein 2 the forced circulation means comprise at least one fan.

5. The fryer according to claim 1 wherein the first and second resistances can be activated simultaneously or selectively according to the type of cooking selected for the food product.

6. The fryer according to claim 1, further comprising
   a third resistance inside the container for directly heating the oil contained in it.

7. The fryer according to claim 1 wherein the basket is entirely arranged inside the container.

8. The fryer according to claim 1 wherein the basket is arranged partially inside the container.

9. The fryer according to claim 1 wherein during each of the steps of a cooking cycle the positioning means adjusts the basket with respect to the container in a point in which the food to be cooked is completely in air or completely in oil or partially in air and in oil.

10. The fryer according to claim 1, further comprising
    second positioning means of the container with respect to an outer housing.

11. The fryer according to claim 10 wherein the second positioning means adjust the container with respect to the outer housing according to the desired heating effect on the oil carried out by the heating means.

12. The fryer according to claim 10 wherein in the outer housing of the fryer a housing for motorized means for actuating the basket into rotation about its horizontal axis is formed.

13. The fryer according to claim 1, further comprising recirculation means of the oil in the container.

14. The fryer according to claim 13 wherein the recirculation means of the oil in the container are a pump.

15. The fryer according to claim 1, wherein the duct has at least one initial portion that extends parallel to the side surface of the container, an intermediate portion that extends below the bottom of the container and in which the first resistance is positioned, and an end portion that extends parallel to the side surface of the container on the opposite side to the initial portion with respect to the container.

16. The fryer according to claim 15 wherein the forced circulation means is in the first portion of the duct.

17. The fryer according to claim 15 wherein the forced circulation means includes a fan that has its rotation axis horizontal.

18. The fryer according to claim 15 wherein the initial portion of the duct has a fresh air inlet formed through the outer housing.

19. The fryer according to claim 15 wherein the end portion of the duct has a heated air outlet arranged at a greater height than the fresh air inlet.

20. The fryer according to claim 19 wherein the container has at least one opening facing the heated air outlet suitable for allowing the passage of the heated air through the basket.

21. The fryer according to claim 1 wherein a discharge passageway of the heated air that has crossed the basket is formed through a cover of the fryer.

22. The fryer according to claim 21 wherein an air filter is provided in the discharge passageway.

23. The fryer according to claim 1 wherein the basket is provided with holding means inside it for the food to be cooked suitable for preventing the food from suffering damage during rotation of the basket.

24. The fryer according to claim 23 wherein each of the holding means consists of a horizontal support plate suspended in a balanced manner and free to rotate about a relative rotation pin so as to conserve the horizontal position during the rotation of the basket through the effect of its own weight.

25. The fryer according to claim 23 wherein each of the holding means consists of a gripping element suitable for holding the food to be cooked integral to the basket during the rotation of the latter.

* * * * *